(12) United States Patent
Lat

(10) Patent No.: US 9,333,634 B2
(45) Date of Patent: May 10, 2016

(54) ENHANCED CAPACITY FASTENER LOAD SYSTEM

(75) Inventor: Geronimo E. Lat, Mundelein, IL (US)

(73) Assignee: Illinois Tool Works Inc., Glenview, IL (US)

( * ) Notice: Subject to any disclaimer, the term of this patent is extended or adjusted under 35 U.S.C. 154(b) by 634 days.

(21) Appl. No.: 13/539,680

(22) Filed: Jul. 2, 2012

(65) Prior Publication Data

US 2013/0026205 A1 Jan. 31, 2013

Related U.S. Application Data

(60) Provisional application No. 61/503,837, filed on Jul. 1, 2011.

(51) Int. Cl.
| | | |
|---|---|---|
| *B25C 5/16* | (2006.01) | |
| *F16B 15/08* | (2006.01) | |
| *B25C 7/00* | (2006.01) | |
| *F16B 15/00* | (2006.01) | |

(52) U.S. Cl.
CPC ............. *B25C 5/1627* (2013.01); *B25C 5/1679* (2013.01); *B25C 7/00* (2013.01); *F16B 15/08* (2013.01); *F16B 15/0015* (2013.01)

(58) Field of Classification Search
CPC .......... B25C 1/00; B25C 1/001; B25C 1/003; B25C 1/005; B25C 5/00; B25C 5/16; B25C 5/1606; B25C 5/1624; B25C 5/1627; B25C 5/1631; B25C 5/1637; B25C 5/1682; B25C 5/1679; B25C 5/1686; B25C 7/00; B25C 5/161–5/162; B25C 1/06; F16B 15/0015; F16B 15/008
USPC ......... 227/119, 120, 127, 135–137, 139, 149; 411/442–445; 206/338–347; 242/608.2, 608.3
See application file for complete search history.

(56) References Cited

U.S. PATENT DOCUMENTS

| | | | | |
|---|---|---|---|---|
| 1,939,631 | A * | 12/1933 | Randall ................. | B21D 53/36 16/16 |
| 2,266,534 | A * | 12/1941 | Cavanagh .............. | F16B 15/08 206/340 |
| 3,189,220 | A * | 6/1965 | Mullaney ....................... | 221/176 |
| 3,279,673 | A * | 10/1966 | Cairatti et al. ................... | 227/85 |
| 3,613,878 | A * | 10/1971 | Langas et al. ................ | 206/340 |
| 3,703,981 | A * | 11/1972 | Smith ........................... | 227/136 |
| 4,037,771 | A * | 7/1977 | Peterson ...................... | 227/130 |
| 4,138,076 | A * | 2/1979 | Oagley ......................... | 242/592 |
| 4,151,944 | A * | 5/1979 | Picton .......................... | 227/120 |
| 4,449,283 | A * | 5/1984 | Berecz ..................... | B23P 19/00 227/136 |
| 4,508,220 | A * | 4/1985 | Pearson ........................ | 206/343 |
| 4,746,046 | A * | 5/1988 | Frye ............................. | 227/120 |
| 4,775,089 | A * | 10/1988 | MacDonald .................... | 227/2 |
| 6,089,437 | A * | 7/2000 | Blacket et al. ................ | 227/136 |
| 6,431,430 | B1 * | 8/2002 | Jalbert .................... | B25C 1/003 227/131 |
| 2008/0105727 | A1 * | 5/2008 | Shor ............................ | 227/120 |

* cited by examiner

*Primary Examiner* — Stephen F Gerrity
*Assistant Examiner* — Joshua Kotis
(74) *Attorney, Agent, or Firm* — Neal, Gerber & Eisenberg LLP

(57) ABSTRACT

A fastener driver tool fastener load system includes a fastener driving tool having a housing including a magazine with a fastener entry end, an opposite shear block end, and a fastener track defined between the ends. A tensioner is mounted to the housing and includes a driven roller. A plurality of fastener strips is disposed linearly in end-to-end fashion and each strip is secured to each other by at least one fastening tape having a free end connected to the driven roller. The tensioner is constructed and arranged for creating a biasing force for urging the fastener strips toward the shear block end.

13 Claims, 3 Drawing Sheets

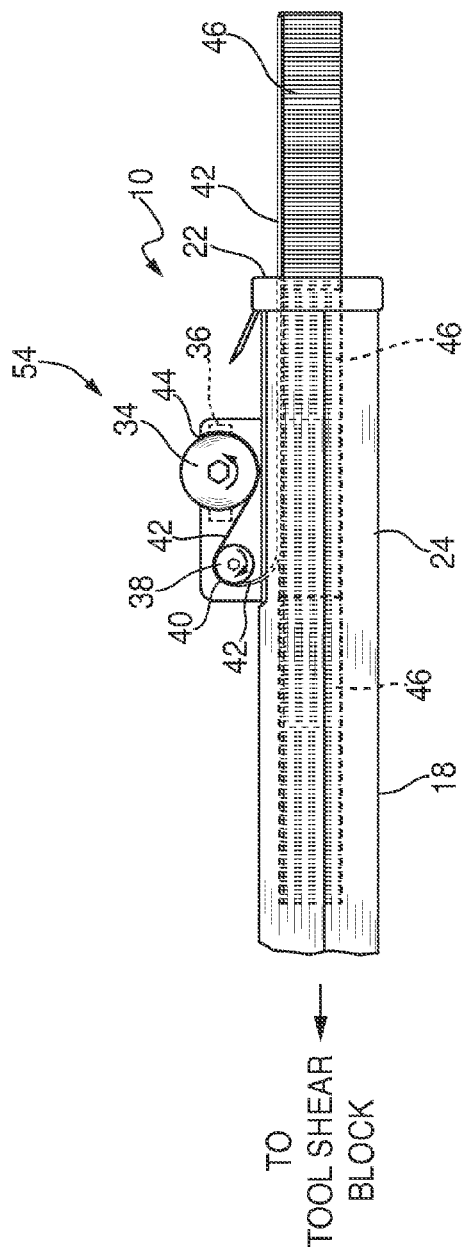
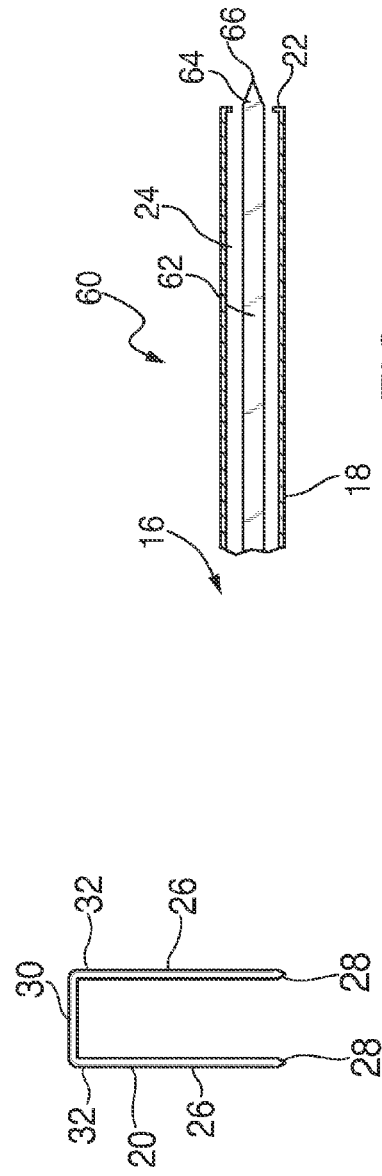

ENHANCED CAPACITY FASTENER LOAD SYSTEM

RELATED APPLICATION

The present application claims priority based on 35 USC §119(e) from U.S. Provisional Application Ser. No. 61/503,837, filed Jul. 1, 2011.

BACKGROUND

The present invention relates to fastener feed systems for automatic fastener driving tools, and more specifically to a system for providing and loading multiple fastener strips into such a tool.

In conventional production line applications for fastener driving tools, such as facilities manufacturing, cabinets, other furniture, pre-hung doors, windows or the like, powered staplers are commonly used. Such tools are typically pneumatically powered, but electric tools are also contemplated. To maintain high volume production, the tools are provided with elongated magazines capable of retaining multiple fastener strips, with four to five strips typically accommodated. Even with such magazines, a production line may be shut down for as much as 15 minutes each hour for the reloading of the multiple fastener tools used in production.

Accordingly, there is an interest by users of such powered fastener drivers for reducing the downtime currently required for reloading the tools with fasteners.

SUMMARY

A system for loading multiple fastener strips into a fastener driving tool is provided, where each strip of fasteners is secured to an adjacent strip by a preferably continuous length of pressure sensitive adhesive tape to form a plurality of connected strips. A sufficient number of strips are connected to each other to form a coil, preferably having a polygonal shape. As the number of strips fastened together by the tape increases, the strips can be stacked in layers.

At a free end of the tape, a first fastener strip is positioned adjacent a rear end of the fastener driving tool, in operational relationship to the conventional entry point of a fastener strip into the tool magazine. The free end is attached to a powered roller located on the tool, which winds up the tape to create a biasing force, drawing the fastener strips successively into the tool magazine.

More specifically, a fastener driver tool fastener load system includes a fastener driving tool having a housing including a magazine with a fastener entry end, an opposite shear block end, and a fastener track defined between the ends. A tensioner is mounted to the housing and includes a driven roller. A plurality of fastener strips is disposed linearly in end-to-end fashion and each strip is secured to each other by at least one fastening tape having a free end connected to the driven roller. The tensioner is constructed and arranged for creating a biasing force for urging the fastener strips toward the shear block end.

In another embodiment, a fastener driver tool is provided for use with a fastener load system including a plurality of fastener strips joined end-to-end with at least one length of tape. The tool includes a fastener tool housing having a magazine with a fastener entry end, an opposite shear block end, and a fastener track defined between the ends. A tensioner is mounted to the housing and includes a driven roller powered by a motor. The tensioner is constructed and arranged for creating a biasing force for urging the fastener strips toward the shear block end.

In yet another embodiment, a fastener coil is provided that is configured for use with a fastener driver tool fastener load system including a fastener driving tool provided with a driven roller. The coil includes a plurality of fastener strips disposed linearly in end-to-end fashion and secured to each other by at least one fastening tape having a free end connected to the driven roller. Each fastener strip is made up of fasteners having a pair of generally parallel legs spaced by a crown, the at least one tape being secured to the crown of the fasteners.

BRIEF DESCRIPTION OF THE DRAWINGS

FIG. 3 is an enlarged fragmentary schematic side elevation of the fastener tool of FIG. 1;

FIG. 4 is a schematic front view of a fastener that is suitable for use with the present system; and FIG. 5 is a fragmentary schematic overhead plan view in partial section of an alternate embodiment of the present system.

DETAILED DESCRIPTION

Figure 1:
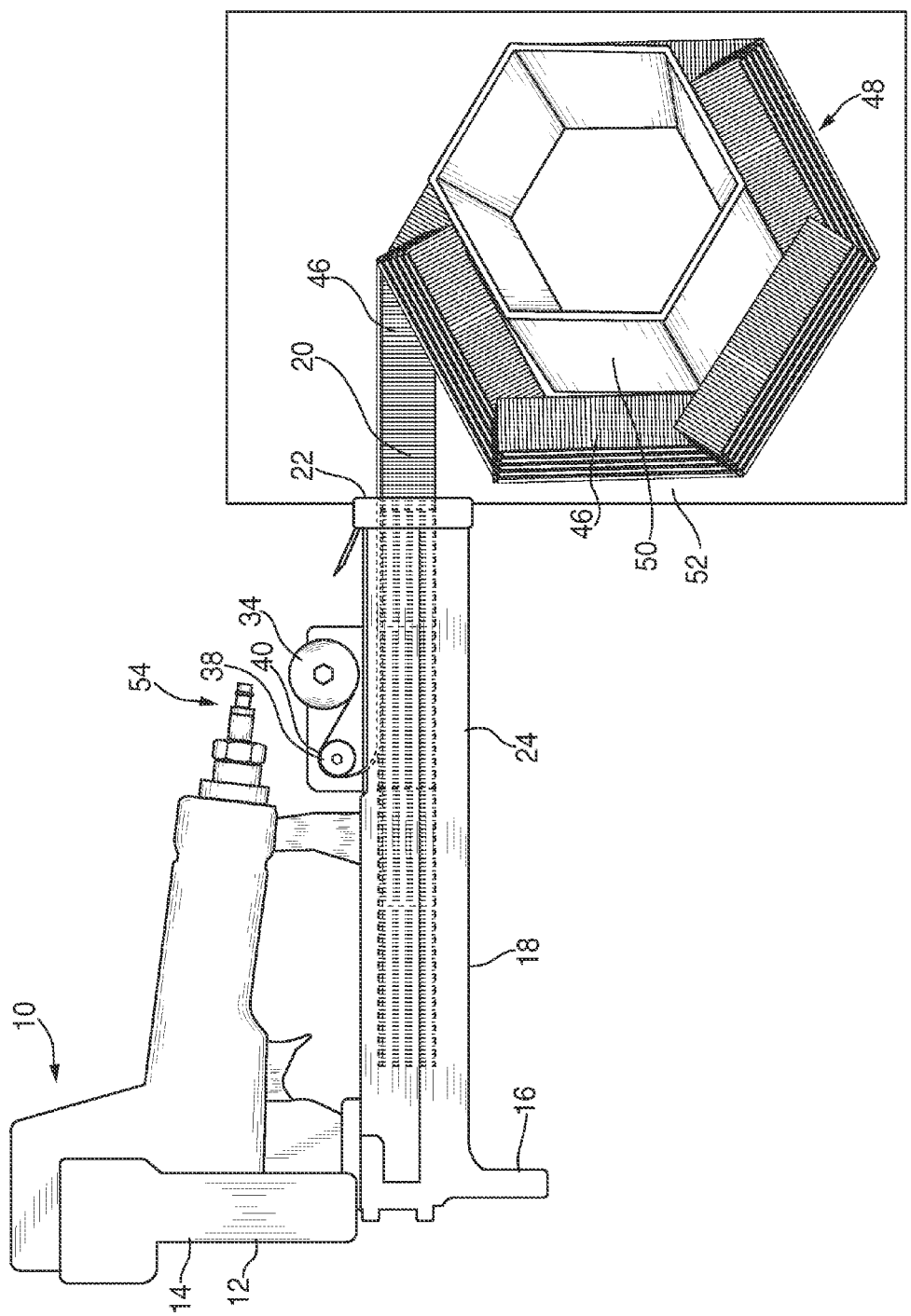
FIG. 1 is a side elevation of a fastener tool equipped with the present enhanced capacity staple load system.

Referring to FIGS. 1 and 3, a fastener driving tool is generally designated 10, and in the preferred embodiment is a pneumatically powered, staple driver of the type typically used in industrial applications for mass produced assembly of window frames, pre-hung doors or the like. However, it is contemplated that the present system could be employed with other types of fastener driving tools employing conventional linear fastener magazines, including, but not limited to combustion powered and electrically powered tools.

The present tool 10 includes a tool housing 12 enclosing a driving source 14 (shown hidden), preferably a reciprocating piston and driver blade (not shown) which are well known in the art. A shear block or nose piece 16 is configured for receiving the driver blade from the driving source 14 and creating a chamber for a fastener to be placed in position for being driven into a workpiece upon receipt of impact from the driver blade, as is well known in the art.

A magazine 18 stores at least one collated strip of fasteners 20, and is conventionally provided with a spring biased follower and follower handle (not shown) for urging the strip of fasteners 20 towards the shear block 16 for being sequentially driven into the workpiece by the driver blade. A magazine endplate 22 is dimensioned for receiving the strips of fasteners, and typically has an opening that is complementary to, and accommodates the shape of the particular fastener 20. Between the shear block 16 and the endplate, the magazine 18 defines a fastener track 24.

Figure 2:
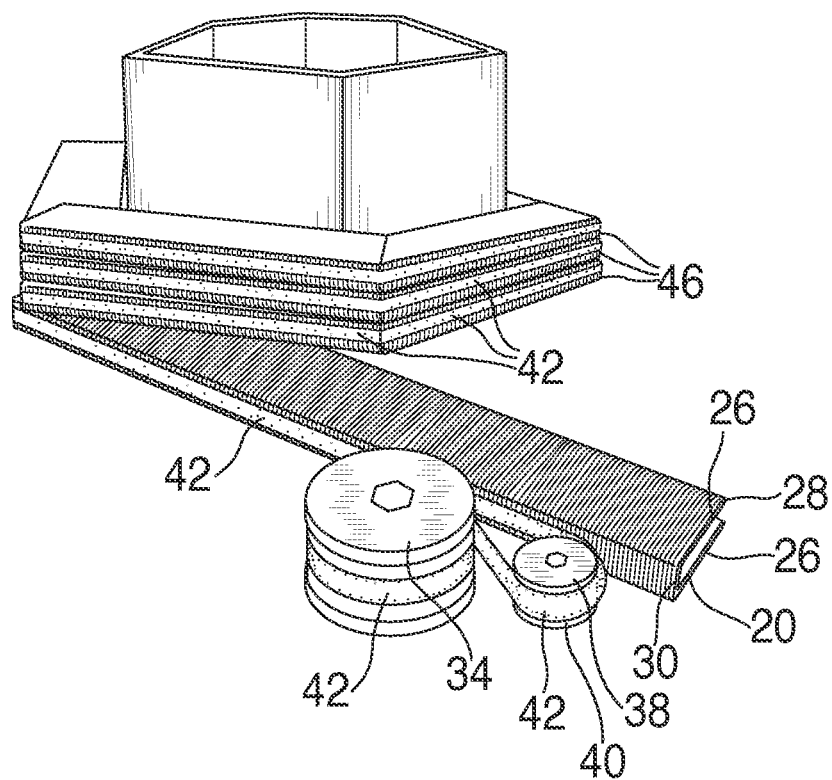
FIG. 2 is a front perspective view of a stand used to support the coiled fasteners prior to feeding same to the fastener driving tool.

Referring now to FIGS. 2 and 4, while other types of fasteners are contemplated, in the present application, the preferred fastener 20 is a staple including a pair of generally parallel, spaced legs 26 each having a sharp point 28. The legs 26 are separated by a generally linear crown 30 joining upper ends 32 in a single, integral, inverted "U"-shape. The length of the legs 26 varies according to the application. Accordingly, the endplate 22 has a generally inverted "U"-shaped opening dimensioned to complement the profile of the fasteners 20.

Referring again to FIGS. 1 and 3, in the present tool 10, the conventional magazine follower, follower handle and return spring are removed, and a powered roller 34 is mounted to the tool housing 12, preferably near the magazine endplate 22. The powered roller 34 is powered, either directly or indirectly by a motor 36, which in the case of a pneumatically powered tool 10, is preferably a pneumatic motor. Alternatively, the motor 36 is electric, and is provided with a clutch as is known in the art. An idler roller 38 is placed on the tool 10 in operational proximity to the powered roller 34, and in the preferred embodiment is located closer to the driving source 14 than to the magazine endplate 22, when compared to the powered roller 34. Preferably, the idler roller 38 is provided with a resilient, rubber-like cover 40.

As seen in FIG. 3, an elongate piece 42 of adhesive tape connects the strips of fasteners 20 together, as discussed below. The piece 42 has a free end 44 that is wound around the idler roller 38, and ultimately is attached to the powered roller 34. Since it has replaced the conventional magazine follower and spring, the present powered roller 34 is used to pull fastener strips 46 into the magazine 18, and at the same time, apply pressure on the fasteners 20 already in the magazine, in the manner of a conventional magazine follower spring. As is well known in the art, fasteners 20 in the magazine 18 need to be urged forward towards the tool shear block 16 so they can be driven by the reciprocating driver blade into the workpiece. Sufficient pulling power is provided by the motor 36 to provide enough torque for preventing any slack or space between the fastener strips 46 located inside the magazine 18. In FIG. 3, three such strips 46 are schematically depicted, two in the magazine 18 and a third about to enter the magazine once space is created by use of the fasteners 20 already in the magazine.

In the present tool 10, the roller motor 36 is preferably pneumatically powered, and features an adjustable torque setting for coordinating the motor pulling power with the respective air pressure so that just enough force is exerted on the tape 42 to pull the strips 46 into the magazine 18 and keep those fasteners 20 in the magazine under sufficient compression so that they are urged towards the shear block 16. Such adjustments are contemplated to be variable depending on the application, the workpiece and the type of fastener employed.

Referring now to FIGS. 1 and 2, a plurality of the fastener strips 46 are shown, held together in end-to-end fashion by the tape 42. With sufficient fastener strips 46 held together, a coil 48 is formed that eventually takes a polygonal shape (here hexagonal), with complementary ends of the strips 46 slightly overlapping or nesting into each other. Other polygonal shapes are contemplated for the coil 48. In a production environment, the strips 46 are optionally wound upon a spool 50, which is rotatable relative to a base plate 52. The motor 36, the powered and idler rollers, 34, 36, the tape 42 and the coil 48 are collectively referred to as the present enhanced capacity fastener load system 54.

The number of fastener strips 46 in the coil 48 formed by the present length of tape 42 is limited only by the available space, the power of the roller motor 36, and the tensile strength of the tape which secures the adjacent fastener strips together. It is contemplated that as the roller 34 fills with tape 42 with extended use of the tool 10, the roller can be disposed of.

In the preferred embodiment, the tape 42 is 3M brand polyester pressure-sensitive tape having a width of approximately ½ inch (1.25 cm). The tape 42 is preferably attached to the fastener strips 46 along the crowns 30 region of the fasteners 20, which separates the spaced, parallel legs 26 of the staples as described above. During installation, the free end 44 of the tape 42 is preferably wound around the power roller 34 at least 1.5 times, with the adhesive side facing inwardly. Once the tool 10 is activated, the motor 36 is powered, which will draw fastener strips 46 into the magazine 18. Some applicator assistance may be needed to properly align the fastener strips 46 as they enter the magazine 18. Once the coil 48 is depleted of fastener strips 46, the motor 36 will fail to sense further resistance, and will rotate freely. After a new fastener spool 50 is provided, the tool 10 is rapidly restored to operation.

Referring now to FIG. 5, an alternate embodiment of the present system 54 is generally designated 60. Components shared with the system 54 are designated with the same reference numbers. A main distinguishing feature of the system 60 is that in order to guide the incoming strip 46 of fasteners 20 to the magazine endplate 22, a magazine rail 62 is located in the fastener track 24 for guiding the fasteners such that the fastener legs 26 straddle the rail. In the system 60, the magazine rail 62 includes an optional extension 64 that projects beyond the endplate 22 in a tapering configuration that tapers or gradually narrows away from the endplate. A rounded or radiused point or tip 66 is preferably formed at a free end of the extension 64. This configuration facilitates guiding of the fastener strip 46 into the magazine fastener track 24. The length and angle of taper of the extension 64 may vary with the application. Other similar shapes of end rail are contemplated for enhancing the alignment of the fastener strip 46 with the magazine fastener track 24.

Thus, it will be seen that the present enhanced capacity fastener load system 54 provides operators with a relatively longer operational cycle between reloading, which facilitates production in the respective plant. Fastener reloading is required less often, and is more easily accomplished than when conventional fastener driving tools are employed.

While a particular embodiment of the present enhanced capacity fastener load system has been shown and described, it will be appreciated by those skilled in the art that changes and modifications may be made thereto without departing from the invention in its broader aspects and as set forth in the following claims.

What is claimed:

1. A fastener driver tool fastener load system, said system comprising:
   an automatic fastener driving tool having a housing including a magazine with a fastener entry end, an opposite shear block end, and a fastener track defined between said ends;
   a tensioner mounted to said housing and including a motor-driven roller mounted to said tool so that the motor-driven roller is closer to said fastener entry end than to said shear block end; and
   a plurality of elongate fastener strips, each said fastener strip including a plurality of formed fasteners connected to each other to form an elongate member, said fastener strips being connected to each other in an end-to-end arrangement, each fastener having a pair of parallel legs spaced by a crown, each fastener strip extending along a longitudinal axis, a fastening tape secured to said crowns of the fasteners of each said fastener strip, said fastener strips secured to each other by said fastening tape and said fastening tape having a free end connected to said motor-driven roller;
   wherein said tensioner is configured to remove said fastening tape from said crowns before said fasteners reach said shear block end, said removal creating a biasing force that urges said fastener strips toward said shear block end.

2. The system of claim 1 wherein said plurality of fastener strips joined by said fastening tape forms a polygonal shape.

3. The system of claim 1 wherein said plurality of fastener strips joined by said fastening tape forms a multi-layered coil having a vertical shape when viewed from a side of the tool.

4. The system of claim 3, wherein at least two of said fastener strips in said coil engage each other in a nesting relationship.

5. The system of claim 1, wherein said tensioner further includes an idler roller disposed on said tool in operational relationship to said motor-driven roller such that said fastening tape is wound about said idler roller prior to attachment to said motor-driven roller.

6. The system of claim 5, wherein said idler roller is provided with a resilient surface.

7. The system of claim 1, wherein said motor-driven roller is disposable.

8. The system of claim 1, wherein said magazine is provided with a magazine rail in said fastener track, said magazine rail having an extension projecting beyond an endplate of said magazine for facilitating alignment of the fastener strips with said fastener track.

9. The system of claim 8, wherein said extension is tapered in a direction extending away from said endplate.

10. A fastener driver tool for use with a fastener load system including a plurality of fastener strips joined end-to-end with at least one length of tape, each fastener strip including a plurality of fasteners, said tool comprising:
    a fastener tool housing including a magazine having an upper surface and a lower surface with an endplate, a fastener entry end, an opposite shear block end, and a fastener track defined between said ends; and
    a tensioner mounted to said housing external to and in operational relationship with said upper surface of the magazine, the tensioner including a motor-driven roller being mounted to said fastener tool housing closer to said fastener entry end than to said shear block end, said tensioner being connected to the tape and configured to roll up and remove from the fastener strips the tape used to join the fastener strips together before the fasteners of the fastener strips reach said shear block end, said removal creating a biasing force that urges: (1) the fastener strips toward said shear block end by pulling the fastener strips into the endplate of the magazine, and (2) the fasteners of each fastener strip in the magazine towards said shear block end.

11. The tool of claim 10, wherein said tensioner further includes an idler roller disposed on said tool in operational relationship to said motor-driven roller such that the tape is wound about said idler roller prior to attachment to said motor-driven roller.

12. A fastener coil configured for use with a fastener driver tool fastener load system including a fastener driving tool provided with a driven roller, said coil comprising:
    a plurality of fastener strips, each fastener strip including a plurality of fasteners connected to each other in a first manner to form an elongate member, said fastener strips disposed in end-to-end fashion and secured to each other in a second manner distinct from the first manner by which the plurality of fasteners of the fastener strips are connected to one another, the second manner including at least one fastening tape having a free end connectable to the driven roller, said fastener strips forming a polygonal shape having six sides when seen from a side view of said system, at least two of said fastener strips engaging each other in a nesting relationship;
    wherein each said fastener strip is comprised of fasteners having a pair of substantially parallel legs spaced by a crown, said at least one fastening tape being secured to said crown of said fasteners.

13. A fastener driver tool fastener load system, said system comprising:
    an automatic fastener driving tool having a housing including a magazine with a fastener entry end, an opposite shear block end, and a fastener track defined between said ends, the fastener track configured to receive a plurality of elongate fastener strips, each fastener strip including a plurality of formed fasteners connected to each other, each fastener having a pair of parallel legs spaced by a crown, said fastener strips being connected to each other in an end-to-end arrangement by a fastening tape secured to said crowns of the fasteners; and
    a tensioner mounted to said housing and including a motor-driven roller mounted to said tool, the tensioner being configured to remove the fastening tape from the crowns before said fasteners reach said shear block end, said removal creating a biasing force that urges said fastener strips toward said shear block end.

* * * * *